Patented Jan. 14, 1941

2,228,666

UNITED STATES PATENT OFFICE 2,228,666

PLASTIC COMPOSITIONS

Lucas P. Kyrides, Webster Groves, Mo., assignor to Monsanto Chemical Company, St. Louis, Mo., a corporation of Delaware No Drawing. Application March 12, 1937, Serial No. 130,531

10 Claims. (Cl. 260—36)

This invention relates to plastic compositions for use in the manufacture of films, lacquers, varnishes, molding compositions, filaments, etc. and it deals particularly with a novel class of solvent and plasticizing compositions characterized in that they are esters containing an aliphatic ketone group.

In my copending application, Serial No. 604,660, filed on April 11, 1932, of which this application is a continuation-in-part, and in my copending application Serial No. 142,801, filed on May 15, 1937, I have disclosed the use of the herein described compounds as solvents and plasticizers for cellulose esters and ethers and other resinous materials, including vinyl-type resins.

The object of the present invention is to provide improved plastic compositions having vinyl resins and modified vinyl resins as their principal constituents. The plasticizing compounds disclosed in my prior copending application are particularly effective for this purpose.

The resins contemplated by the present invention are polymerized vinyl esters and particularly modified vinyl resins resulting from partial hydrolysis of polymerized vinyl esters which are subsequently condensed with aldehydes or similar reagents to cause acetal formation. Resins of the latter type are well known in the art as vinyl acetal resins and are sold under such trade names as "Formvar," "Alvar," etc. These modified vinyl resins present particular problems when it is attempted to utilize them in the production of plastic compositions. The ordinary well-known plasticizers cannot be used with such resins with any outstanding success; dibutyl phthalate, for example, is not compatible and retentive in sufficient proportions to produce a plastic product of sufficient flexibility. The degree of retentivity and compatibility of the phosphate plasticizers (tributyl phosphate, triphenyl phosphate and tricresyl phosphate) does not permit the production of plastic compositions of great flexibility.

In the production of laminated glass, the intermediate plastic sheets or layers must meet certain tests. It is highly desirable that such plastic sheets retain their flexibility at low temperatures.

I have found that esters of acetone alcohol ($CH_3COCH_2OH$) and its homologues, are excellent solvents and plasticizers for vinyl resins particularly those of the acetal type. Not only do the modified vinyl resins dissolve and retain large proportions of these substances, but the resins themselves are soluble in the substances.

Many of the plasticizing compounds contemplated by the present invention are formed conveniently by condensing chloroacetone or its homologues with a metallic salt of a half acid ester in the case of dicarboxylic acids, and neutral salts in the case of monocarboxylic acids. Acetonyl benzoate is made conveniently by reacting chloroacetone with sodium benzoate, preferably in a non-aqueous medium. The preparation of the compounds forms no particular part of the present invention. The methods of preparation of the compounds are disclosed in my copending application referred to hereinabove and are further detailed in my application Serial No. 130,530, filed March 12, 1937, which has issued as Patent No. 2,119,993.

The method of producing a typical compound of the invention, ethyl acetonyl phthalate, is briefly as follows: Phthalic acid (anhydride) is partially esterified with ethyl alcohol to form the half ethyl ester. This half ester is neutralized with sodium hydroxide or carbonate and the resulting sodium salt is heated with chloroacetone.

The half esters may be not only those obtained from monohydric alcohols, but also those obtained from monoethers of glycols or diethers of glycerol; in general, ethers of polyhydric alcohols having one free esterifiable alcoholic hydroxyl group.

The adaptability of the present invention to the plastic art can be appreciated by the fact that the solvents and plasticizing compounds have a wide range of boiling points adapting them to the field of volatile solvents, high-boiling solvents and plasticizing materials. This can be appreciated more readily from the following list of compounds which fall within the scope of the present invention.

| Compound | Boiling point (approximate) |
| --- | --- |
| Acetonyl acetate | 172° C./760 mm. |
| Acetonyl benzoate | 148° C./17 mm. |
| Acetonyl meta-chlorobenzoate | 142° C./5 mm. |
| Acetonyl dichlorobenzoate | 160° C./5 mm. |
| Acetonyl ethyl phthalate | 168° C./6 mm. |
| Diacetonyl phthalate | 222° C./7 mm. |
| Acetonyl stearate | 49° C–50° C. (melting point). |
| Ethyl butanonyl phthalate | 326° C.–7° C./763.5 mm. |
| n-Butyl acetonyl phthalate | 325° C.–7° C./760 mm. |

The solvents and plasticizing compounds of the invention are esters of acetone alcohol and its homologues. The homologues of chloroacetone include the monochlorides derived from methyl ethyl ketone, diethyl ketone, ethyl propyl ketone, etc. In the preparation of the esters a variety of monocarboxylic and polycarboxylic acids which do not contain a phenolic hydroxyl or amino group may be employed. These include benzoic acid, dichlorobenzoic acid, acetic acid, propionic acid, butyric acid, sebacic acid, stearic acid, oxalic acid, tartaric acid, maleic acid, succinic acid, phthalic acid, isophthalic acid, terephthalic acid, chlorophthalic acids, diglycolic acid, naphthalene dicarboxylic acids, malic acid, citric acid, etc., and the half esters of dicarboxylic acids, such as monoethylphthalic, monobutylphthalic, monomethylsuccinic acid, etc.

The manner of using these solvents and plasticizers follows in general the practice employed with other low-boiling solvents, high-boiling solvents and plasticizers. Examples follow hereinbelow to illustrate specific embodiments of the invention, but it is to be understood that they are illustrative only and that they may be varied in a manner understood by those skilled in the art, to meet the requisites of any specific plastic composition.

The low-boiling esters are particularly valuable as solvents for the modified vinyl resins. They may be used in the customary manner for the production of coating compositions to replace the usual solvents. They possess the advantage that they are capable of dissolving great quantities of the modified vinyl resins.

The higher-boiling esters are employed in a manner analogous to that of present day high-boiling solvents such as dibutyl phthalate, tricresyl phosphate, etc. In this use, however, they are characterized by superiority over the known plasticizers, manifested in their increased compatibility and retentivity in the resin. Their rates of hydrolysis and their water solubility are satisfactorily low. The stability of the materials to light is excellent. When used in conjunction with phthalate or phosphate plasticizers they yield resinous compositions of greatly enhanced flexibility at low temperatures. As a result of such use together with phthalate or phosphate plasticizers, an increased compatibilty and retentivity of these plasticizers results.

The improvement obtained by means of my invention is illustrated by the results obtained and tabulated below in the case of ethyl acetonyl phthalate.

In these films a resin resulting from the hydrolysis of polymerized vinyl acetate and subsequent condensation of the polymer with formaldehyde was used. This resin is known in the trade under the mark "Formvar." The proportions of modifying agents added are given as grams incorporated for each 100 grams of the resin. The bends represent the number of bends through 180° and back which the film of the indicated thickness of that particular formulation withstands without breaking while maintained at a temperature of —20° F. (—29° C.).

| Film composition g. plasticizer/100 g. Formvar | Compatibility | Flexibility No. 180° bends at —20° F. | Film thickness inch/1000 |
| --- | --- | --- | --- |
| 80 ethyl acetonyl phthalate (EAP). | Very good | 7 | 47.2 |
| 60 EAP 20 tributyl phosphate (TBP). | Good | 80–114 | 41.3 |
| 40 EAP 40 TBP | ___do___ | 135–268 | 38.5 |
| 20 EAP 60 TBP | Fair | 265–330 | 40.7 |
| 60 EAP 20 DEP | Very good | 55–70 | 41.9 |
| 40 EAP 40 DEP | ___do___ | 31 | 38.2 |
| 20 EAP 60 DEP | ___do___ | 35–48 | 38.3 |
| 40 EAP 20 TBP 20 diethyl phthalate (DEP). | ___do___ | 40 | 39.1 |
| 20 EAP 40 TBP 20 DEP | ___do___ | 90–122 | 36.3 |
| 20 EAP 20 TBP 40 DEP | ___do___ | 130–150 | 35.5 |
| 30 EAP 30 TBP 20 DEP | ___do___ | 165 | 33.0 |
| 30 EAP 20 TBP 30 DEP | ___do___ | 65–93 | 38.3 |
| 20 EAP 30 TBP 30 DEP | ___do___ | 110–180 | 32.8 |

Ethyl acetonyl phthalate is an exceptionally strong solvent for Formvar and is essential to obtain good compatibility of plasticizers of the phthalate and phosphate type. By proportioning the plasticizers as indicated from the above results it is possible to obtain films characterized by exceptionally good retentivity and flexibility at low temperatures; where low temperature conditions do not obtain, the mixed type plasticizers are not necessary.

From the foregoing description it will be apparent that the invention is susceptible of many modifications within the knowledge of those skilled in the art and that the invention is not limited to the examples specifically set forth, but contemplates a specific class of esters characterized in that they embody an aliphatic ketone group, as solvents and plasticizers for a particular class of resins. Although the invention has been described with respect to modified vinyl resins, it is to be understood to be not so limited. The particular class of resins described are regarded as difficult to plasticize and have been cited by way of illustration of the superior advantages of the present invention, therefore, it is apparent that it is of value also for resins not as difficult to plasticize, that is, polymerized vinyl esters and halides.

What I claim is:

1. A plastic composition of matter embodying a polymerized vinyl resin and ethyl acetonyl phthalate.

2. A plastic composition of matter embodying a polymerized vinyl resin and a neutral ester of a carboxyl-substituted hydrocarbon in which at least one of the carboxyl groups is esterified by a monohydric aliphatic ketone alcohol.

3. A plastic composition of matter embodying a polyvinyl acetal resin and a neutral ester of a carboxyl-substituted hydrocarbon in which at least one of the carboxyl groups is esterified by a monohydric aliphatic ketone alcohol.

4. A plastic composition of matter embodying a polyvinyl acetal resin and a neutral ester of a dicarboxyl-substituted hydrocarbon of which one carboxyl group is esterified by an unsubstituted aliphatic alcohol and the other carboxyl group is esterified by a monohydric aliphatic ketone alcohol.

5. A plastic composition of matter embodying a polymerized vinyl resin and a neutral phthalate ester corresponding to phthalic acid in which at least one carboxyl group is esterified by a monohydric aliphatic ketone alcohol.

6. A plastic composition of matter embodying a polymerized vinyl resin and a neutral phthalate ester corresponding to phthalic acid in which one carboxyl group is esterified by an unsubstituted aliphatic alcohol and the other carboxyl group is esterified by a monohydric aliphatic ketone alcohol.

7. A plastic composition of matter embodying a polymerized vinyl resin and a mixture of two modifying substances, one of which is a plasticizer selected from the group consisting of alkyl and aryl phthalates and alkyl and aryl phosphates and the other of which is a neutral ester of a dicarboxyl-substituted hydrocarbon of which one carboxyl group is esterified by an unsubstituted aliphatic alcohol and the other carboxyl group is esterified by a monohydric aliphatic ketone alcohol.

8. A plastic composition of matter embodying a polyvinyl acetal resin and a mixture of two modifying substances, one of which is a plasticizer selected from the group consisting of alkyl and aryl phthalates and alkyl and aryl phosphates and the other of which is a neutral ester of a dicarboxyl-substituted hydrocarbon of which one carboxyl group is esterified by an unsubstituted aliphatic alcohol and the other carboxyl group is esterified by a monohydric aliphatic ketone alcohol.

9. A plastic composition of matter embodying a polyvinyl acetal resin substantially identical with the resin formed by the condensation of formaldehyde with a partially hydrolyzed polyvinyl ester, and as a modifier therefor, a neutral phthalate ester corresponding to phthalic acid in which one carboxyl group is esterified by an unsubstituted aliphatic alcohol and the other carboxyl group is esterified by a monohydric aliphatic ketone alcohol.

10. A plastic composition of matter embodying a polyvinyl acetal resin substantially identical with the resin formed by the condensation of formaldehyde with a partially hydrolyzed polyvinyl ester, and as a modifier therefor, a mixture of two modifying substances, one of which is a neutral phthalate ester corresponding to phthalic acid in which one carboxyl group is esterified by an unsubstituted aliphatic alcohol and the other carboxyl group is esterified by a monohydric aliphatic ketone alcohol and the other of which is a plasticizer selected from the group consisting of alkyl and aryl phthalates and alkyl and aryl phosphates.

LUCAS P. KYRIDES.